United States Patent
Gao et al.

(10) Patent No.: US 9,839,033 B2
(45) Date of Patent: *Dec. 5, 2017

(54) WHITE SPACE USAGE FOR WIRELESS LOCAL AREA NETWORK DEVICES

(71) Applicant: THOMSON LICENSING, Issy les Moulineaux (FR)

(72) Inventors: Wen Gao, West Windsor, NJ (US); Hou-Shin Chen, San Diego, CA (US)

(73) Assignee: THOMSON Licensing, Issy-les-Moulineaux (FR)

( * ) Notice: Subject to any disclaimer, the term of this patent is extended or adjusted under 35 U.S.C. 154(b) by 145 days.

This patent is subject to a terminal disclaimer.

(21) Appl. No.: 15/284,906

(22) Filed: Oct. 4, 2016

(65) Prior Publication Data

US 2017/0026966 A1 Jan. 26, 2017

Related U.S. Application Data

(60) Continuation of application No. 14/920,401, filed on Oct. 22, 2015, now Pat. No. 9,491,756, which is a (Continued)

(51) Int. Cl.
*H04W 72/04* (2009.01)
*H04J 3/06* (2006.01)
(Continued)

(52) U.S. Cl.
CPC ....... *H04W 72/0446* (2013.01); *H04J 3/0641* (2013.01); *H04J 3/0673* (2013.01);
(Continued)

(58) Field of Classification Search
CPC ...... H04J 3/0635; H04J 3/0641; H04J 3/0673; H04W 72/044; H04W 36/0061;
(Continued)

(56) References Cited

U.S. PATENT DOCUMENTS 6,243,372 B1 6/2001 Diab
6,888,844 B2 5/2005 Mallory et al.
(Continued)

FOREIGN PATENT DOCUMENTS

CN 101136937 3/2008
CN 101594617 12/2009
(Continued)

OTHER PUBLICATIONS

Cordeiro et al., "IEEE 802.22: An Introduction to the First Wireless Standard Based on Cognitive Radios," Journal of Communication, vol. 1, No. 1, Apr. 2006, Academy Publisher 2006, pp. 38-47, Internet Citation retrieved on Jul. 8, 2008.

(Continued)

*Primary Examiner* — Hoang-Chuong Vu
(74) *Attorney, Agent, or Firm* — Brian J. Dorini; Catherine A. Cooper

(57) ABSTRACT

A method and apparatus are described including defining a neighbor set for each access point, selecting a first clock in a first access point, the selected clock having a highest accuracy as a grand master clock, advising neighboring access points to synchronize with the selected grand master clock and transmitting a message to schedule a quiet period based on the grand master clock. Also described are a method and apparatus including receiving a beacon message, inspecting clock descriptors in the beacon message, selecting a best master clock responsive to the inspection and transmitting a message to schedule a quiet period based on the selected best master clock.

12 Claims, 6 Drawing Sheets

Related U.S. Application Data division of application No. 13/817,560, filed as application No. PCT/US2010/046727 on Aug. 26, 2010, now Pat. No. 9,282,557.

(51) Int. Cl.

| | | |
|---|---|---|
| *H04W 16/14* | (2009.01) | |
| *H04W 48/10* | (2009.01) | |
| *H04W 36/00* | (2009.01) | |
| *H04W 48/16* | (2009.01) | |
| *H04W 56/00* | (2009.01) | |
| *H04W 84/12* | (2009.01) | |
| *H04W 88/08* | (2009.01) | |

(52) U.S. Cl.
CPC ........... *H04W 16/14* (2013.01); *H04W 48/10* (2013.01); *H04W 56/0015* (2013.01); *H04W 72/044* (2013.01); *H04W 36/0061* (2013.01); *H04W 48/16* (2013.01); *H04W 56/002* (2013.01); *H04W 84/12* (2013.01); *H04W 88/08* (2013.01)

(58) Field of Classification Search
CPC ... H04W 48/16; H04W 56/002; H04W 84/12; H04W 88/08
See application file for complete search history.

(56) References Cited

U.S. PATENT DOCUMENTS

| | | | |
|---|---|---|---|
| 7,050,452 B2* | 5/2006 | Sugar | H04W 16/14 |
| | | | 370/208 |
| 7,822,005 B2 | 10/2010 | Ptasinski et al. | |
| 8,255,708 B1* | 8/2012 | Zhang | G06F 1/3206 |
| | | | 713/300 |
| 2004/0106408 A1 | 6/2004 | Beasley et al. | |
| 2005/0135318 A1 | 6/2005 | Walton et al. | |
| 2005/0135429 A1 | 6/2005 | Bingham | |
| 2007/0249341 A1 | 10/2007 | Chu et al. | |
| 2007/0286195 A1 | 12/2007 | Ilnickl et al. | |
| 2009/0147768 A1* | 6/2009 | Ji | H04J 3/0664 |
| | | | 370/350 |
| 2009/0286510 A1 | 11/2009 | Huber et al. | |
| 2010/0085989 A1 | 4/2010 | Belhadj et al. | |
| 2010/0098202 A1 | 4/2010 | Lai et al. | |
| 2010/0220692 A1 | 9/2010 | Diab | |
| 2011/0170645 A1 | 7/2011 | Barnette et al. | |
| 2011/0216658 A1 | 9/2011 | Etkin et al. | |
| 2011/0216660 A1* | 9/2011 | Lee | H04J 3/06 |
| | | | 370/252 |
| 2011/0299853 A1 | 12/2011 | Zampetti et al. | |

FOREIGN PATENT DOCUMENTS

| | | |
|---|---|---|
| CN | 101697502 | 4/2010 |
| EP | 1936838 | 6/2008 |
| EP | 2066142 | 8/2009 |
| JP | 2006303695 | 11/2006 |
| JP | 2009524276 | 6/2009 |
| JP | 2010028228 | 2/2010 |
| JP | 2010068127 | 3/2015 |
| WO | WO2007083257 | 7/2007 |

OTHER PUBLICATIONS

IEEE Standard, "IEEE Standard for a Precision Clock Synchronization Protocol for Networked Measurement and Control Systems, IEEE Std. 1588-2008 (Revision of IEEE Std. 1588-2002)," IEEE Instrumentation and Measurement Society, Jul. 24, 2008, pp. C1-69.
Huawei Technologies, "Inter-BS Synchronization and Fast Detection of WRAN Systems," Jul. 14, 2006, IEEE 802.22-06/0124r0—Jul. 31, 2006, pp. 1-22, retrieved from Internet on May 17, 2011.

* cited by examiner

| Existing Fields | Clock Descriptor Field | Master Clock Descriptor Field | Quiet Period Scheduling Field |
|---|---|---|---|

WHITE SPACE USAGE FOR WIRELESS LOCAL AREA NETWORK DEVICES

This application is a continuation of co-pending U.S. application Ser. No. 14/920,401 dated Oct. 22, 2015, which is a divisional of U.S. application Ser. No. 13/817,560 dated Feb. 19, 2013 now U.S. Pat. No. 9,282,557 which is a 371 of International Application PCT/US2010/046727 dated Aug. 26, 2010 herein incorporated by reference.

FIELD OF THE INVENTION

The present invention relates to a method and apparatus for wireless local area network (WLAN) devices to operate in unoccupied portions of the digital broadcast television spectrum.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the multiple receivers form a subset of all the receivers up to and including all of the receivers. A broadcast system is a system in which a server transmits the same data to all of the receivers simultaneously. That is, a multicast system by definition can include a broadcast system.

The use of unoccupied digital TV spectrum by unlicensed radio transmitters has not before been addressed since the transition of TV broadcasting from analog to digital was only recently completed.

The FCC has issued a ruling that allows the usage of TV white space, i.e., TV channel 2-51 that are not being used by incumbent users, if certain requirements are met. Specifically, WLAN devices need to sense the incumbent usage, need mechanisms for coexistence and resource sharing, and need to adapt their transmission characteristics to fit into one or more digital TV (DTV) channels.

SUMMARY OF THE INVENTION

When multiple TV white space (TVWS) devices want to access the same TV channel, a resource sharing mechanism is required. This is known as a coexistence problem of heterogeneous systems in TVWS.

A method and apparatus are described including defining a neighbor set for each highest accuracy as a grand master clock, advising neighboring access points to synchronize with the selected grand master clock and transmitting a message to schedule a quiet period based on the grand master clock. In case multiple clocks have the same highest accuracy then the clock having the lowest media access control (MAC) address is selected from among the multiple clocks. This might occur if more than one AP can receive a GPS or atomic clock. Also described are a method and apparatus including receiving a beacon message, inspecting clock descriptors in the beacon message, selecting a best master clock responsive to the inspection and transmitting a message to schedule a quiet period based on the selected best master clock.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

In addressing the issue of the use of TV white space (TVWS) by WLAN devices, there are two main areas to consider. The first is modification of WLAN transmission characteristics and the second is spectrum sensing and quiet period (QP) synchronization.

It is known that IEEE 802.11 a/g transmission requires a 20 MHz channel bandwidth, while IEEE 802.11n transmission requires 20 MHz or 40 MHz channel bandwidth depending on the selection of the modulation coding scheme (MCS). However, in the DTV spectrum, the bandwidth of a channel is 6 MHz in US and 7 or 8 MHz in Europe or Asia. For exemplary purposes, a 6 MHz DTV channel used herein in all examples and illustrations. The same concept is equally applicable to 7 or 8 MHz DTV channels. In addition, there are a variety of WLAN devices such as devices that are compatible with IEEE 802.11 a/g/n standards. For illustrative purposes, IEEE 802.11a devices are used for illustrations.

To resolve the channel mismatch between the 20 MHz (or 40 MHz) bandwidth used by most WLAN devices and the 6 MHz bandwidth for DTV channels, two methods are described and analyzed below. The first option is channel bonding and the second option is channel scaling.

Figure 1:
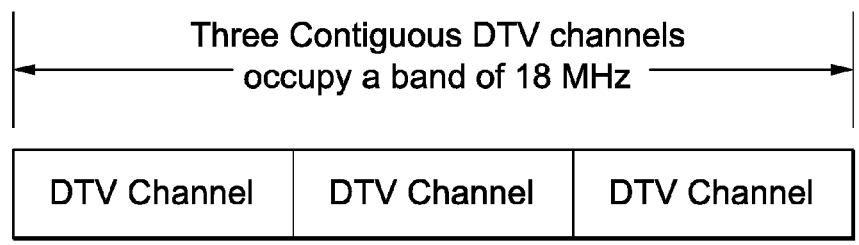
FIG. 1 shows the three contiguous DTV channels for channel bonding.
Figure 2:
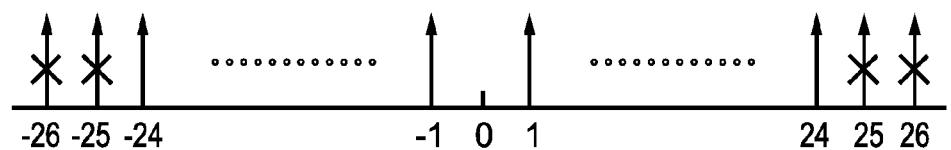
FIG. 2 shows the reduction of the WLAN signaling bandwidth by removing the edge carriers.

FIG. 1 shows the bonding of three contiguous white space DTV channels to form an 18 MHz channel. In IEEE 802.11a, carrier indices from −26 to 26 are used for data transmissions and pilot carrier. The total occupied bandwidth for IEEE 802.11a device is 20 MHz. In the three-channel bonding case, since the bandwidth has been reduced by (20-18)/20=10%, the total number of usable carriers is correspondingly reduced to the set with indices from −24 to 24, as shown in FIG. 2. In this way, the number of carriers is reduced by $2/26 \approx 8\%$.

In the modified IEEE 802.11a transmitter, the formation of the modified preamble is same as a regular preamble except the carriers −26, −25, 25, 26 are removed. The formation of the data symbol should take into consideration the reduced number of carriers. The corresponding data rate for each modulation coding scheme should be modified accordingly as well. Thus, the computation of the transmission time needs to be modified.

The advantage of this method is the modification of the IEEE 802.11a PHY and MAC layer are minimal. The disadvantage is that three consecutive (contiguous) white space DTV channels are difficult to find in most regions of the USA. In addition, since each modified WLAN transmission requires three channels, it is also difficult to facilitate resource sharing and coexistence among WLAN transmissions due to the limited number of 18 MHz channels that can be formed.

In an alternative embodiment of the present invention, the total number of usable carriers in the set can be further reduced by removing carriers −24 and 24 such that the number of carrier is reduced by 3/26=12%.

The second option is channel scaling. The sample rate for an IEEE 802.11a device is 20 Mega-samples per second and the corresponding occupied channel band width is also 20 MHz. Thus, the sample rate can be modified in order to change the occupied bandwidth of the modified WLAN transmissions.

For example, the sample rate can be changed to 6 Mega-samples per second, yielding an occupied channel bandwidth of 6 MHz. Thus, the WLAN transmissions will fit into a single DTV white space channel. Similarly, if there are two consecutive DTV white space channels available, the sample rate can be modified to 12 Mega-samples per second. For three consecutive white space channels, the sample rate will be 18 Meg-samples per second. The advantage of this method is that the modification of a WLAN transceiver is minimal, i.e., the sample clock. In general, the sample clock or other system clocks are derived from phase locked loop (PLL) circuitry. The parameters of the PLL can be changed to modify the sample clock and other corresponding clock signals. Due to the requirement that any use of the TV white space cannot interfere with incumbent users, the transmission signal from WLAN devices in TV white space should be filtered using pulse shaping filters. Thus, the pulse shaping filter needs to be modified based on the available channel bandwidth and the sample rate.

Figure 3:
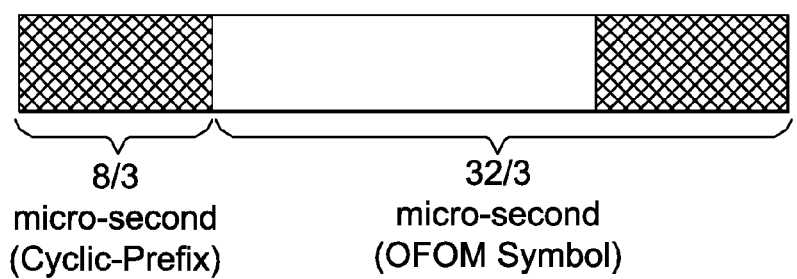
FIG. 3 is an example of an orthogonal frequency division multiplexing (OFDM) symbol for use in modified WLAN transmissions.

Note that the duration of an OFDM symbol in the modified WLAN transmissions is also changed. Based on using a 64 point inverse fast Fourier transform (IFFT), a symbol has 64 sample points. For example, as shown in FIG. 3, if the sample rate is 6 Mega-samples per second, then the duration of an OFDM symbol is $$\frac{1}{6} \times 64 \,\mu s = \frac{32}{3} \mu s$$

Since the cyclic prefix is ¼ of the length of a (OFDM) symbol, ¼ is added to 1 to yield a total symbol length of 5/4 of an OFDM symbol without prefix. After adding the cyclic pre-fix, the total length of an OFDM symbol thus becomes $$\frac{32}{3} \times \frac{5}{4} \mu s = \frac{40}{3} \mu s$$

The length of the preamble is also changed accordingly. Thus, the computation of transmission time is also changed.

The second issue is spectrum sensing and quiet period (QP) synchronization. Based on the FCC ruling, TV white space devices should access a geo-location database to identify the DTV channels in a region (geo-location) that are not occupied by TV stations. Since wireless microphones are also licensed secondary users in TV channels, WLAN devices in TV white space should be able to identify the TV channels used by wireless microphone transmissions. If wireless microphone usage in a given geo-location is also registered in the database, such as wireless microphones used in sporting or show events, spectrum sensing may not be needed. However, the usage of wireless microphones for news gathering is usually unpredictable and hence, cannot be registered in the database beforehand. To identify those unregistered wireless microphone usages, spectrum sensing is required.

Since the sensing threshold for wireless microphones is −114 dbm, WLAN devices should be quiet when sensing wireless microphone signals in a given DTV channel. Thus, synchronization of WLAN transmissions is required. In this way, the quiet period for sensing can also be synchronized. In the following, methods for synchronization of WLAN devices in TV white space and methods for scheduling the quiet period are described.

Figure 4:
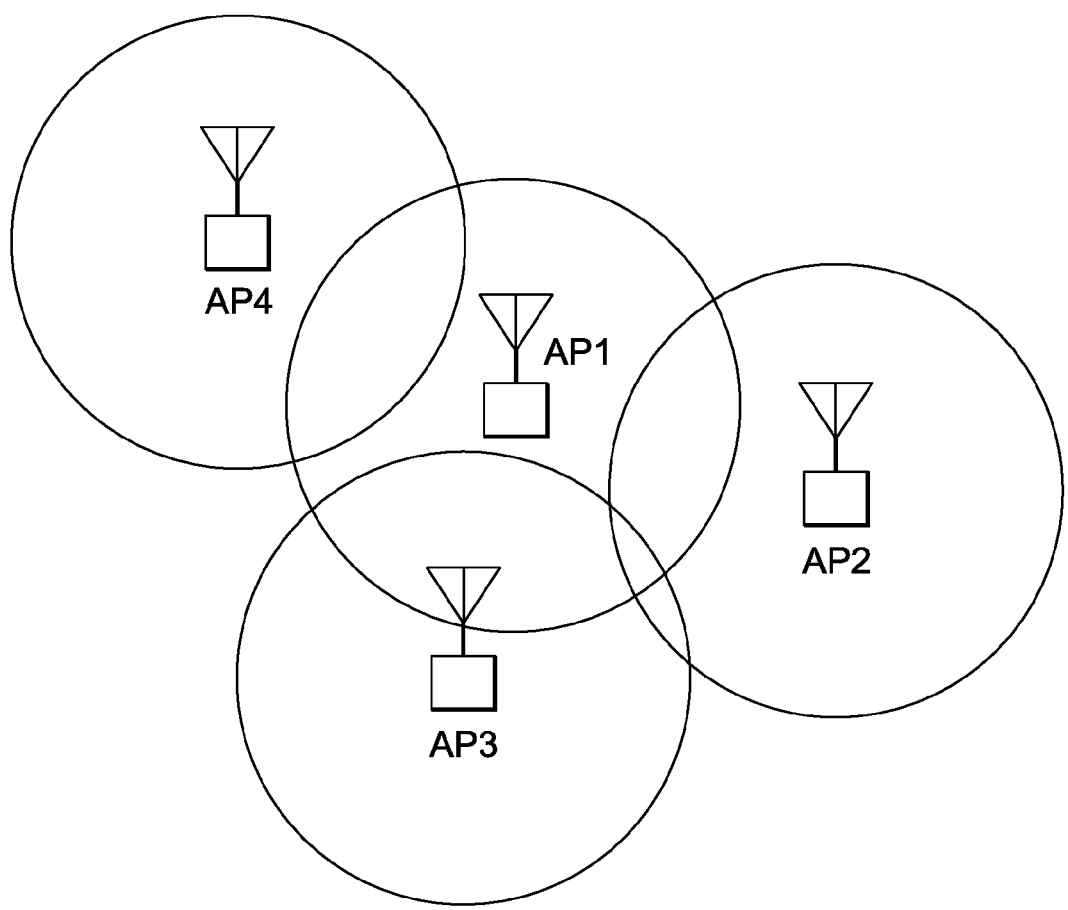
FIG. 4 is a schematic diagram of multiple WLAN networks.

In terms of synchronization of WLAN devices in TV white space, consider a WLAN network in infrastructure mode in which multiple stations communicate with an access point (AP). Assume multiple WLAN networks operate in a given DTV white space channel, as shown in FIG. 4.

In a WLAN network, stations are synchronized with the AP through a timer synchronization function (TSF). The TSF maintains a 64-bit timer running at 1 MHz. The TSF timer in the AP is reset to zero upon initialization and is then incremented by the 1 MHz clock of the AP. The AP sends a beacon frame periodically. At each beacon, the current value of the timer is inserted in the beacon frame. A station receiving the beacon frame updates its TSF timer with the value of the timer it receives from the AP in the beacon frame, modified by any processing time required to perform the update operation. Thus, the timer values of all of the stations in the network receiving the beacon are synchronized to that of the AP.

However, synchronization within a network is not enough. Synchronization among multiple networks operating in the same white space channel is required. To achieve this goal, only the APs in these networks need to be synchronized.

If all the APs are equipped with a Global Positioning System (GPS) receiver, which can receive a GPS satellite signal reliably, the APs can be synchronized to the received satellite clock signal that is derived from precise atomic clocks. However, APs may not be equipped with GPS receivers or may not receive the GPS satellite signals reliably especially if they are located in an indoor environment. Alternative synchronization methods for the TSF timers may be required.

One option is to synchronize to the fastest (or slowest) clocks in the neighborhood. An access point (AP) receives beacons from APs in the neighborhood. If the time stamp in the beacon is larger than (or less than) the value in the local TSF timer, the local TSF timer value is replaced by the time stamp in the received beacon frame, modified by any processing time required to perform the update operation. In this way, all the TSF timers of the APs in a region will be synchronized to the fastest clock (or the slowest clock) in the region. However, the fastest (or the slowest) clock may not be the best clock in terms of accuracy and stability. Note that the beacon signals can be sent in an operating channel or in a common control channel.

An alternative option is synchronization through backhaul links and over-the-air communications. Network time protocol (NTP) is usually used to synchronize computer clocks in a computer network such as the Internet. However, NTP suffers from coarse accuracy, on the order of tens of milliseconds. The synchronization accuracy in WLAN network should be on the order of micro-seconds. Thus, NTP is not suitable for synchronization of network clocks for the use of TVWS by WLAN devices.

IEEE 1588 is a protocol for precision clock synchronization, which can provide accuracy on the order of microseconds. However, the protocol requires the devices to be synchronized should be in a subnet or in a few local subnets that are connected by switches equipped with good boundary clocks. Since APs in WLAN networks may be in different subnets and the switches may not have good boundary clocks. IEEE 1588 may not be directly applied for synchronization of network clocks for the use of TVWS by WLAN devices.

The IEEE 1588 protocol can however, be modified and applied for synchronization of network clocks for the use of TVWS by WLAN devices. Assume all the APs in a region have backhaul links that connect to a spectrum server in the Internet. During the installation phase or the start-up phase, the location, transmission power and the clock descriptor of the APs are registered in the spectrum server. The clock descriptor contains clock characteristics such as the clock accuracy, stability and the source of the clock. In addition, APs can also report the set of APs from which it can receive and decode data and clock signals correctly to the spectrum server.

Since an AP can only hear beacon frames from APs in its neighborhood and the spectrum server knows the topology and clock characteristics of all the APs, the spectrum server can select the clock from one of the APs in the neighborhood as a master clock and inform the corresponding APs to synchronize with the selected master clock by replacing the local TSF timer value with the time stamp in the beacon frame of the AP with the master clock, modified by the processing time used for this operation. To achieve higher (better) accuracy, messages similar to IEEE 1588 messages such as Sync message, Follow_Up message, Delay_Req message and Delay_Resp message can be used to compute the propagation delay, which is then used to adjust local TSF timer value.

In one embodiment of the present invention, for a given AP, the spectrum server can select the master clock in the AP's neighborhood based on best master clock algorithms defined in IEEE 1588 and inform the APs through a backhaul link. Since the best master clock algorithm uses the clock descriptors of APs in the neighborhood, it is a local selection method.

In an alternative embodiment of the present invention, a spectrum server can do better in terms of clock selection. Since the spectrum server has global knowledge of the clock characteristics of APs in the region, it can select the best clock as the grand master clock in this region. For example, the best clock can be extracted from received GPS signals or from an atomic clock. In case multiple clocks have the same highest accuracy then the clock having the lowest media access control (MAC) address is selected from among the multiple clocks. This might occur if more than one AP can receive a GPS or atomic clock. The spectrum server informs the neighbor APs that can hear the beacon of the grand master AP to synchronize their clocks with the grand master clock using the beacon signal of the grand master AP with any necessary adjustment for processing. Since the neighboring APs have synchronized with the grand master clock, they can be selected as master clock for their own neighboring APs. In this way, all the clocks in this region are synchronized to the grand master clock. This global selection method should perform better than the local selection method described above.

Figures 5, 6:
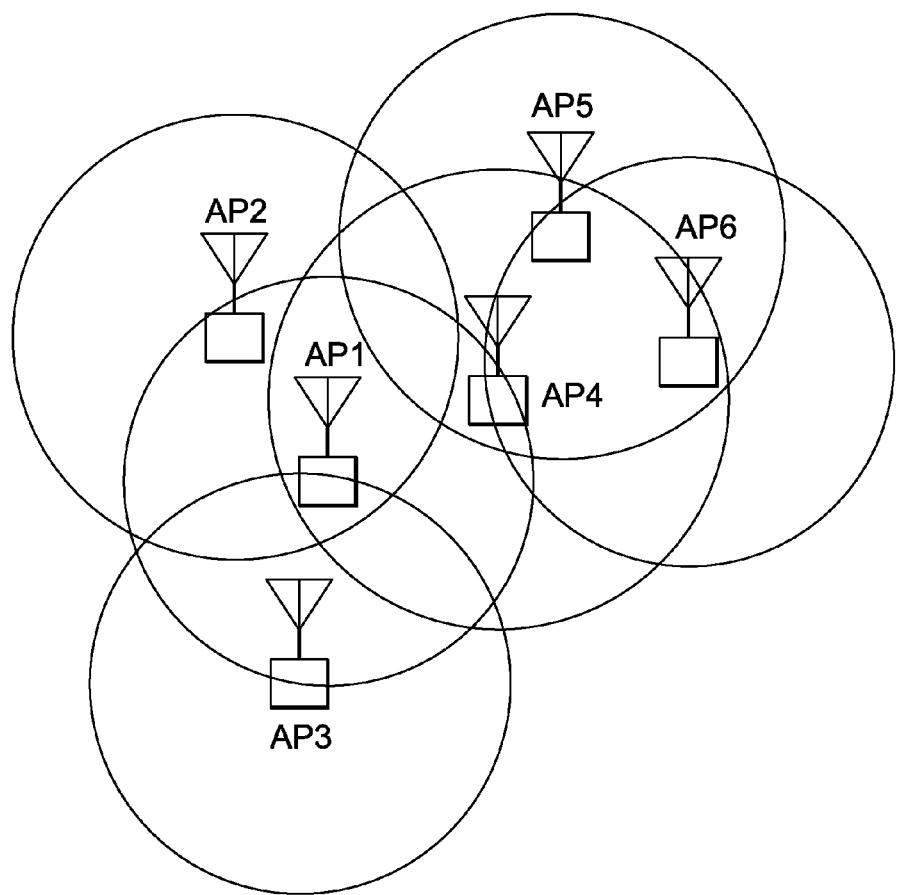
FIG. 5 is a schematic diagram of synchronization of multiple access points (APs).
FIG. 6 shows an exemplary modified beacon frame.

FIG. 5 is used as an example. The method described below works with both the global selection method and the local selection method described above. Define the neighbor set of APx as the set of APs such that the APx can receive and decode the beacon frames sent by the APs in the set. Denote the neighbor set of APx as, N(x). Thus, FIG. 5 has the following neighbor sets:

$N(1)=\{2,3,4\}$ $N(2)=\{1\}$, $N(3)=\{1\}$, $N(4)=\{1,5,6\}$ $N(5)=\{4,6\}$ $N(6)=\{4,5\}$

Now assume the clock in AP1 has the highest accuracy and stability. AP1 may have the highest accuracy if AP1 can and has received a GPS or atomic clock and synchronized its clock to the GPS or atomic clock or because it has the best local master clock. AP1 is chosen as the grand master clock. The spectrum server informs the neighbor APs that can hear the beacon of the grand master AP to synchronize their clocks with the grand master clock using the beacon signal of the grand master AP with any necessary adjustment for processing. Since the neighboring APs have synchronized with the grand master clock, they can be selected as master clock for their own neighboring APs. In this way, all the clocks in this region are synchronized to the grand master clock. Thus, the APs in Ap1's neighborhood, i.e., AP2, AP3 and AP4, will synchronize their clocks to the clock of AP1. Since AP4, AP5 and AP6 can hear each other and AP4 has been synchronized to the grand master clock, AP4 will be chosen as the master clock for AP5 and AP6.

In the situation where there is no central spectrum server, the AP has to select the clock by itself. In this case, each AP will send its clock descriptor together with the time stamp in its beacon signal. Note that the clock descriptor is a new field added to a beacon frame. Each AP can run the best master clock algorithm defined in IEEE 1588 to select the master clock based on the beacon frames it can hear in its neighborhood.

An additional field can be added to the beacon frame, i.e., its master clock descriptor, to describe the master clock to which it is synchronized. The master clock descriptor is defined as the clock descriptor of itself if it is not synchronized to any other clock or the descriptor of its master clock. In this way, the master clock field can track back to the grand master clock. Now the clock selection method can be modified as follows: For a given AP, the AP first runs "the best master clock algorithm" using the master clock descriptor. If there is a tie, it then runs "best master clock algorithm" using the clock descriptor of the clock of the tied APs and selects the best one as the its master clock.

In terms of scheduling quiet periods in order to sense the channels, synchronization must be accomplished first. If synchronization has not been accomplished then it will not be possible to discern if any microphones are using a given DTV channel.

After all the APs in a region (geo-location) are synchronized, the spectrum server can schedule the quiet period. For example, the spectrum server can send a message to all the APs through a backhaul link to ask the APs to be quiet when their TSF counter is in the range of [x,y], where y-x determines the length of the quiet period. This is called centralized quiet period scheduling.

If there is no spectrum server, a distributed quiet period scheduling method is needed. In this case, the APs with a master clock or the grand master clock will send a quiet period scheduling message in the beacon frame or send the QP scheduling message (signal) separately to inform its neighboring APs to schedule a QP. The modified beacon frame format is shown in FIG. 6.

Figure 7:
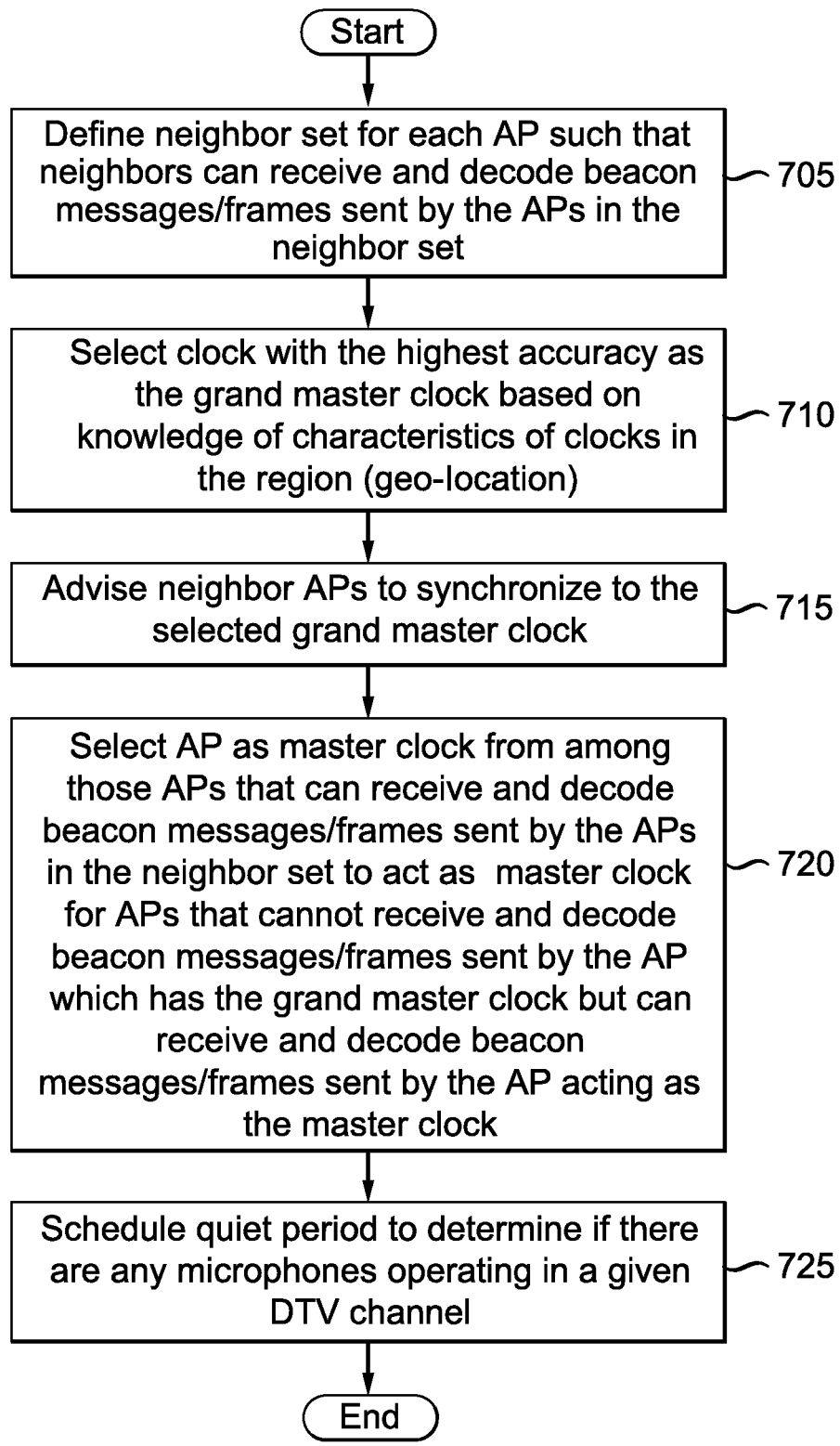
FIG. 7 is a flowchart of an exemplary embodiment of the global clock selection method in accordance with the principles of the present invention.

FIG. 7 is a flowchart of an exemplary embodiment of the global clock selection method in accordance with the principles of the present invention. The depicted global clock selection method operates in a spectrum server. At 705, the spectrum server defines a neighbor set for each AP such that neighbors can receive and decode beacon messages (frames) sent by the APs in the neighbor set. At 710, the spectrum server selects the clock with the highest accuracy as the grand master clock based on knowledge of characteristics of clocks in the region (geo-location). In case multiple clocks have the same highest accuracy then the clock having the lowest media access control (MAC) address is selected from among the multiple clocks. This might occur if more than one AP can receive a GPS or atomic clock. At 715, the spectrum server advises neighbor APs to synchronize to the selected grand master clock. At 720, the spectrum server selects an AP as a master clock from among those APs that can receive and decode beacon cannot receive and decode beacon messages (frames) sent by the AP which has the grand master clock but can receive and decode beacon messages (frames) sent by the AP acting as the master clock. At 725, the spectrum server sends out a message schedules a quiet period to determine if there are any microphones operating in a given DTV channel. All time stamps in all beacon messages (frames) have to be modified by the recipient to account for processing and transmission time.

Figure 8:
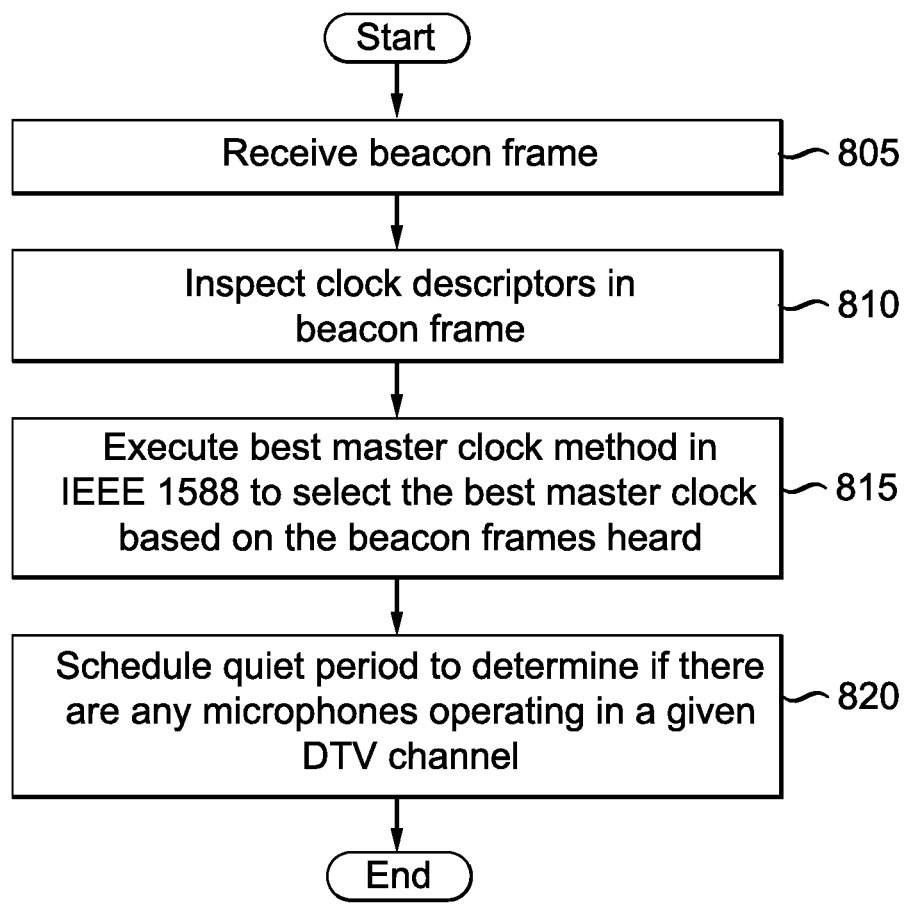
FIG. 8 is a flowchart of an exemplary embodiment of the local clock selection method in accordance with the principles of the present invention.

FIG. 8 is a flowchart of an exemplary embodiment of the local clock selection method in accordance with the principles of the present invention. The depicted local clock selection method operates in each AP. At 805, the AP receives a beacon frame. At 810, the AP inspects the clock descriptors in the received beacon frame. At 815, the AP execute best master clock method in IEEE 1588 to select the best master clock based on the beacon frames heard. At 820, the AP sends out a message schedules a quiet period to determine if there are any microphones operating in a given DTV channel. All time stamps in all beacon messages (frames) have to be modified by the recipient to account for processing and transmission time.

Figure 9:
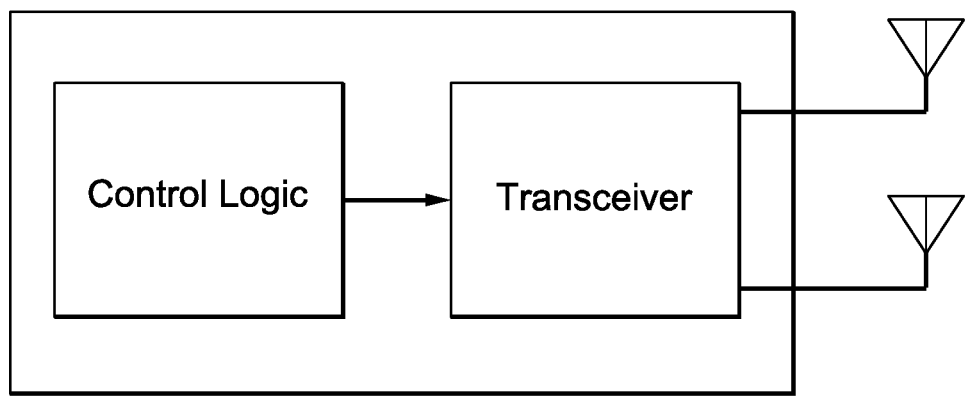
FIG. 9 is a block diagram of a device operating in accordance with the principles of the present invention.

FIG. 9 is a block diagram of a device operating in accordance with the principles of the present invention. The device depicted can be either a spectrum server or an AP. The transceiver actually transmits and receives data and any control signals and the control logic performs all other functions.

Specifically, when operating as a spectrum server, the control logic module of device of FIG. 9 includes means for defining a neighbor set for each access point, means for selecting a first clock in a first access point, the selected clock having a highest accuracy as a grand master clock and means for selecting a second clock in a second access point as a master clock, the second access point being able to receive and decode beacon messages transmitted by the first access point synchronized with the grand master clock. In case multiple clocks have the same highest accuracy then the clock having the lowest media access control (MAC) address is selected from among the multiple clocks. This might occur if more than one AP can receive a GPS or atomic clock. The transceiver modules of the device of FIG. 9 includes means for advising neighboring access points to synchronize with the selected grand master clock and means for transmitting a message to schedule a quiet period based on the grand master clock.

Specifically, when operating as an access point (AP), the transceiver module of the device of FIG. 9 includes means for receiving a beacon message. The control logic module of the device of FIG. 9 includes means for inspecting clock descriptors in the beacon message, means for selecting a best master clock responsive to the inspection and means for transmitting a message to schedule a quiet period based on the selected best master clock.

To ensure that an AP is aware of its status as having the grand master clock or a master clock, its neighboring APs will send master clock and grand master clock selection messages to the APs with a master clock or the grand master clock. If APx with master clock status is synchronized to another AP, e.g., APy, then APx will use the same quiet period scheduling message in the beacon frame of APy as in its own beacon frame. In this way, the quiet period scheduling message of the AP with the grand master clock or a master clock can propagate the QP scheduling message (signal) through the networks.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
    receiving a beacon message, said beacon message having a clock descriptor field, a master clock descriptor field and a quiet period scheduling field;
    inspecting said clock descriptors field and said master clock descriptor field in said beacon message;
    selecting a master clock responsive to said inspection; and
    transmitting a message to schedule a quiet period based on said selected master clock, wherein said master clock is selected based on one of stability, accuracy and speed.

2. The method according to claim 1, wherein said method operates in an access point.

3. The method according to claim 1, wherein said selection is performed by executing IEEE 1588 master clock selection method.

4. The method according to claim 1, wherein recipients of said transmitted message modify a time stamp in said messages responsive to time to receive and process said messages.

5. An apparatus comprising:
   means for receiving a beacon message, said beacon message having a clock descriptor field, a master clock descriptor field and a quiet period scheduling field;
   means for inspecting said clock descriptors field and said master clock descriptor field in said beacon message;
   means for selecting a master clock responsive to said inspection; and
   means for transmitting a message to schedule a quiet period based on said selected master clock, wherein said master clock is selected based on one of stability, accuracy and speed.

6. The apparatus according to claim 5, wherein said apparatus is an access point.

7. The apparatus according to claim 5, wherein said means for selection is performed by executing IEEE 1588 master clock selection method.

8. The apparatus according to claim 5, wherein recipients of said transmitted message modify a time stamp in said messages responsive to time to receive and process said messages.

9. An apparatus comprising:
   a transceiver, said transceiver receiving a beacon message, said beacon message having a clock descriptor field, a master clock descriptor field and a quiet period scheduling field;
   control logic, said control logic inspecting said clock descriptors field and said master clock descriptor field in said beacon message, said control logic in communication with said transceiver;
   said control logic selecting a master clock responsive to said inspection; and
   said transceiver transmitting a message to schedule a quiet period based on said selected master clock, wherein said master clock is selected based on one of stability, accuracy and speed.

10. The apparatus according to claim 9, wherein said apparatus is an access point.

11. The apparatus according to claim 9, wherein said control logic selects said master clock by executing IEEE 1588 master clock selection method.

12. The apparatus according to claim 9, wherein recipients of said transmitted message modify a time stamp in said messages responsive to time to receive and process said messages.

* * * * *